United States Patent [19]

Cordts et al.

[11] 4,295,907
[45] Oct. 20, 1981

[54] METHOD OF MAKING GLASS FIBER REINFORCED LAMINATE

[75] Inventors: Howard P. Cordts, Grafton; Joan E. Karloske, Saukville, both of Wis.

[73] Assignee: Freeman Chemical Corporation, Port Washington, Wis.

[21] Appl. No.: 107,834

[22] Filed: Dec. 28, 1979

[51] Int. Cl.³ .............................................. B29C 19/00
[52] U.S. Cl. .................................. 156/246; 156/249; 156/272; 156/324; 204/159.14; 204/159.16; 428/426; 428/914
[58] Field of Search ............... 156/272, 324, 246, 249, 156/245; 204/159.16, 159.19, 159.14; 428/426, 914

[56] References Cited

U.S. PATENT DOCUMENTS

| | | | |
|---|---|---|---|
| 3,652,356 | 3/1972 | Van Gasse | 156/272 |
| 3,655,483 | 4/1972 | Borrel et al. | 156/272 |
| 3,666,591 | 5/1972 | Hall | 156/272 |
| 3,773,638 | 11/1973 | Gotah et al. | 156/272 |
| 3,897,295 | 7/1975 | Dowbenko et al. | 156/272 |
| 3,958,072 | 5/1976 | Araki et al. | 156/272 |
| 4,105,118 | 8/1978 | Williams | 156/272 |
| 4,171,387 | 10/1979 | Fogle et al. | 156/272 |
| 4,214,026 | 7/1980 | Ibata et al. | 156/272 |

Primary Examiner—James J. Bell

[57] ABSTRACT

Glass fiber reinforced plastic laminates including randomly oriented glass fibers, embedded within unsaturated polyester resins, are provided over at least one surface thereof with a gel coat, essentially free of the glass fibers. The gel coat is formed from resins which are polymerizable in the presence of ultraviolet radiation. The gel coat is at least partially cured on a transparent carrier film by exposing gel coat resins to ultraviolet radiation. Thereafter randomly oriented glass fibers and unsaturated polyester resin syrup are applied onto the gel coat to form the resulting laminate. The gel coat is selected to provide superior weathering characteristics and resistance to deterioration from ultra-violet radiation exposure, e.g., sunlight, when compared to the corresponding properties of the unsaturated polyester resin in which the randomly oriented glass fibers are embedded.

5 Claims, 4 Drawing Figures

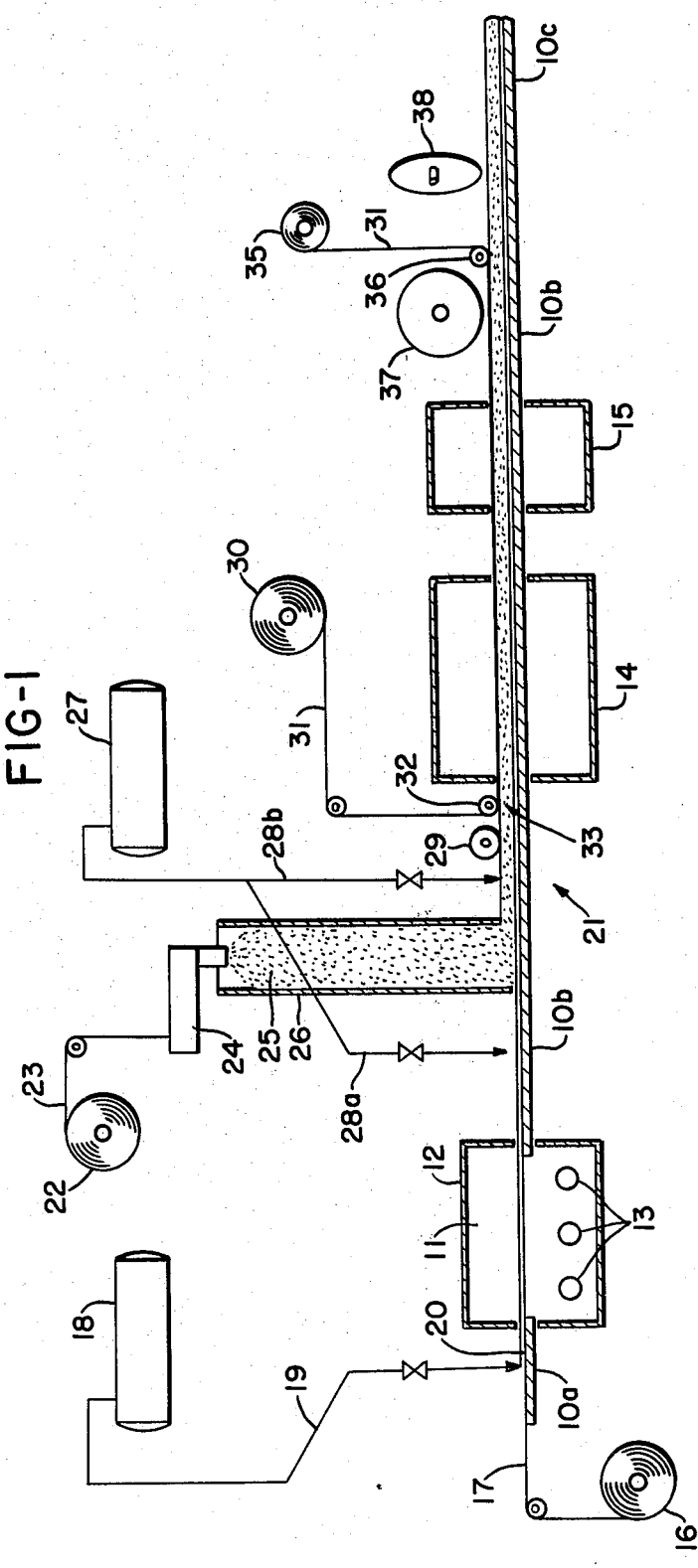
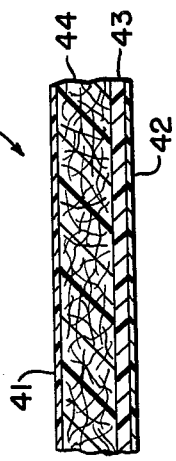
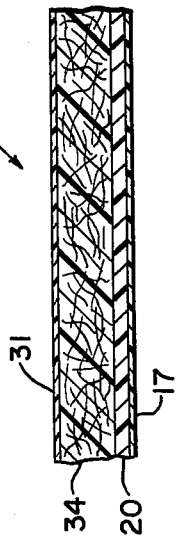

METHOD OF MAKING GLASS FIBER REINFORCED LAMINATE

BACKGROUND OF THE INVENTION

1. Field of the Invention

The present invention relates to glass fiber reinforced plastic laminate sheets and a method of making the same.

2. Description of the Prior Art

Heretofore continuous processes for producing glass fiber reinforced plastic laminates have employed a run-out table over which a clear cellophane film is drawn. Polymerizable unsaturated polyester resin syrup and randomly oriented glass fibers are applied in a substantially uniform thickness to the cellophane film. A covering cellophane film is applied to form a sandwich which is drawn through a heating zone to accomplish polymerization of the unsaturated polyester resin and produce a rigid, glass fiber reinforced plastic sheet. The sandwich may be flat or may be profiled, e.g., corrugated, prior to curing. The cured laminate wiull correspondingly be flat or profiled. Customarily, such sheets are transparent or translucent although opaque sheets find utility in building construction, planking, stadium seating. Such sheets are generally referred to as FRP (fiber reinforced plastic) sheets. The unsaturated polyester resin sheets do not weather well for several reasons. The glass fibers have a tendency to bloom at the exposed surface and create multiple wicking sites which allow atmospheric moisture to penetrate beneath the exposed surface of the FRP sheet. Unsaturated polyester resins have a tendency to discolor when exposed to ultraviolet radiation, e.g., atmospheric sunlight. The discoloration of the transparent or translucent FRP sheets diminishes their light transmission properites and renders them less useful when intended for light transmitting installations.

One means for improving the weatherability of FRP sheets has been to apply a film of polyvinyl fluoride (PVF) to the weather-exposed surface of the FRP laminate. The PVF film normally has been applied during the fabrication process as a substitute for a covering cellophane sheet, after the unsaturated polyester resin syrup and glass fibers have been applied to a bottom cellophane sheet. The PVF films have excellent weather resistance and tend to retard the discoloration of the unsaturated polyester resin plastic substances to which they are adhered. However the adhesion of PVF films to unsaturated polyester resin laminates has been unreliable. Alternative procedures for improving the weatherability of FRP panels have been long sought after.

SUMMARY OF THE INVENTION

According to the present invention, FRP laminates can develop appreciable weatherability and can retard fiber bloom problems by applying a gel coat over the weather-exposed surface of the FRP laminates during the fabrication process.

According to this invention, the gel coat is a weather-resistant polymerizable plastic composition which can be cured upon exposure to ultraviolet radiation. Typical weather-resistant, UV curable resinous substances are various acrylates and particularly various urethane acrylates. The UV curable resinous composition is applied as a thin film over a first sheet of transparent carrier film, e.g., cellophane. The transparent carrier film and UV curable resin film are exposed to ultraviolet radiation of sufficient intensity and duration to achieve at least partial curing of the UV curable resinous composition. Thereafter ordinary unsaturated polyester resin syrup and randomly oriented glass fibers are applied on top of the partially cured gel coat of UV curable resinous composition. Thereafter a covering cellophane sheet is applied on top of the unsaturated polyester resin and randomly oriented glass fibers. The resulting sandwich laminate is heated to complete the cure of the gel coat and to complete the cure of the unsaturated polyester resin syrup. Following the cure of the laminate, the sandwich is cooled and cut to lengths as required.

In one embodiment of the invention, the gel coat is applied to a transparent carrier film, e.g., cellophane, which carries the laminate through the processing and which is removed from the product prior to use. In an alternative embodiment, the gel coat is applied to the top run of a transparent carrier film which moves as a continuous belt; the gel coat is at least partially cured on the carrier film and then transferred directly to a second carrier belt for completion of the laminate and for curing.

BRIEF DESCRIPTION OF THE DRAWINGS

FIG. 1 is a schematic illustration of apparatus adapted to practice the invention;

FIG. 2 is a cross-section illustration of the present laminate prior to cure of the unsaturated polyester resin syrup;

FIG. 3 is a cross-section illustration of the improved glass fiber reinforced laminate obtained by practicing the invention;

DESCRIPTION OF THE PREFERRED EMBODIMENT(S)

Figure 4:
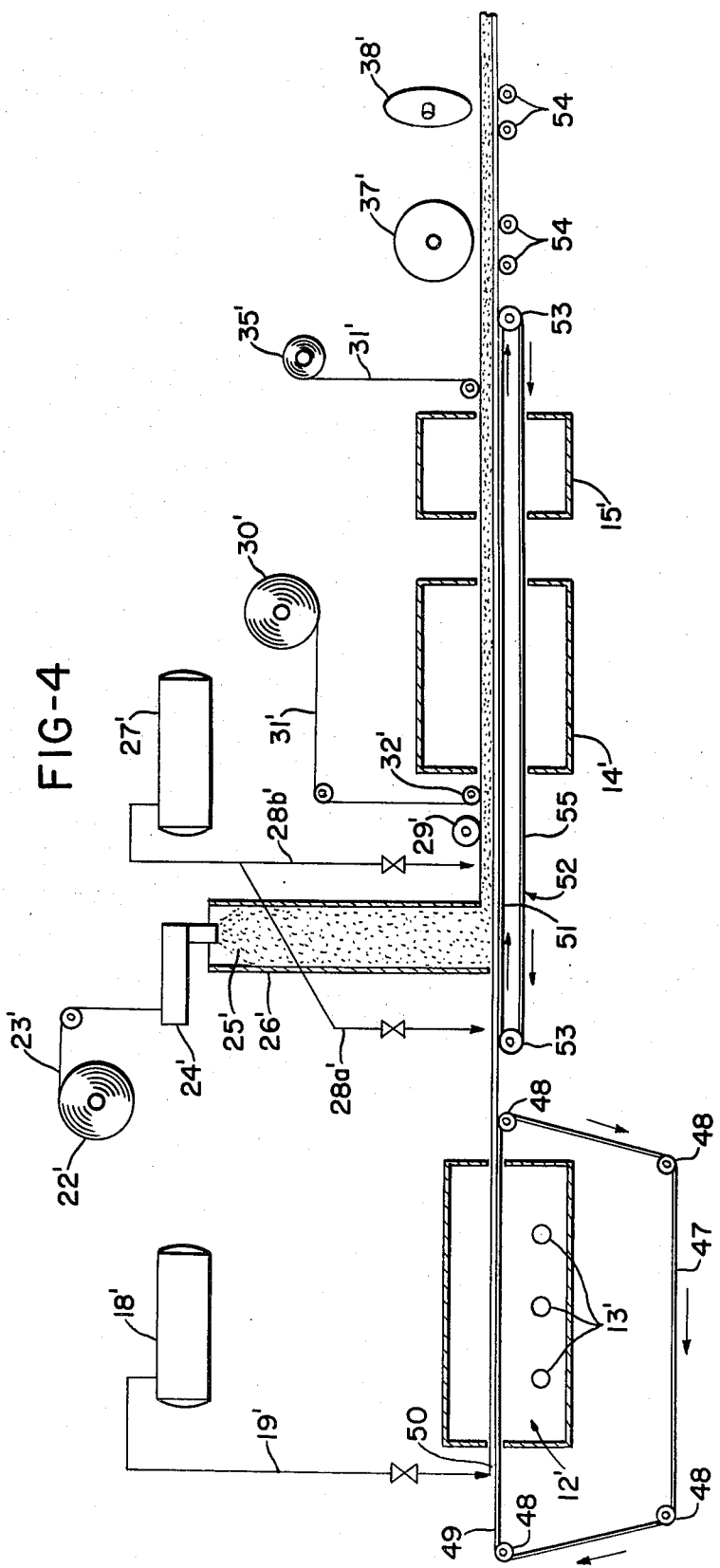
FIG. 4 is a schematic illustration of apparatus adapted to practice an alternative embodiment of the invention.

Referring to FIG. 1 there is illustrated an installation adapted to the practice of the invention. A run-out table 10a, 10b, 10c has an opening 11. A UV enclosure 12 is provided with one or more sources 13 of ultraviolet radiation. The run-out table 10b extends through a heating zone 14 and a cooling zone 15 to a delivery end 10c. A first roll 16 of cellophane film supplies a cellophane film 17 to the run-out table 10a, 10b. A gel coat resin tank 18 delivers gel coat resin through a conduit 19 to the top surface of the cellophane film 17 which is resting upon the run-out table portion 10a. The bottom cellophane film 17 containing a film 20 of gel coat resin is delivered through the ultra-violet enclosure 12 wherein the film 10 of gel coat resin is at least partially cured as a consequence of its exposure to ultraviolet radiation from the sources 13. During transit from table 10a to 10b, cellophane film 17 is unsupported. If desired, a glass or clear plastic plate (not shown) may be provided for supporting the film 17 between the tables 10a, 10b. Thereafter the film 17 with the partially cured gel coat 20 is delivered to the run-out table portion 10b wherein randomly oriented glass fibers are deposited in the region 21. Normally the glass fibers are generated from a spool 22 of glass roving 23 which is delivered to a chopper 24 and chopped into randomly oriented fibers 25 which descend as a cloud through an enclosure 26 to the glass fiber deposition region 21. Unsaturated polyester resin syrup is provided in a tank 27 and delivered through conduits 28a, 28b to the run-out rable 10b wherein the unsaturated polyester resin syrup is combined with the randomly oriented glass fibers 25. A roller 29 kneads the glass fibers and unsaturated polyester resin syrup and substantially entirely embeds the randomly oriented fibers within a plastic continuum. A second cellophane roll 30 delivers a second cellophane film 31 over a roller 32 which brings the cellophane film 31 into contact with the unsaturated polyester resin syrup and randomly oriented glass fibers creating a sandwich construction 33 as shown in FIG. 2. The sandwich construction includes a bottom cellophane film 17, a film 20 of gel coat resin, a layer 34 comprising unsaturated polyester resin syrup and randomly oriented glass fibers, and a top cellophane film 31. At this stage, i.e., prior to entry into the heating zone 14, the gel coat film 20 has been partially cured as a result of its exposure to ultraviolet radiation in the ultraviolet enclosure 12. The layer 34 of unsaturated polyester resin syrup and randomly oriented glass fibers has not been cured. The randomly oriented glass fibers do not penetrate the gel coat film 20 because it has been partially cured and functions as a barrier to penetration. The top cellophane film 31 has been applied in such fashion that air bubbles are removed (by the operation of the roller 32) from the sandwich 33.

The sandwich 33 thereafter is delivered through the heating zone 14 maintained at a sufficient temperature and for a sufficient duration to achieve substantially complete polymerization of the gel coat film 20 and the unsaturated polyester resin syrup contained within the layer 34. In the preferred embodiment, the unsaturated polyester resin of the layer 34 is copolymerized with those portions of the film 20 of the gel coat resin which has not been completely cured during exposure to ultraviolet radiation in the ultraviolet enclosure 12.

The cured sandwich 33 is delivered from the heating zone 14 through a cooling zone 15 which may be merely an extension of the run-out table 10b exposed to ambient atomsphere. Where space requirements do not permit an extension of the run-out table 10b for this purpose, accelerated cooling may be achieved in an enclosed cooling zone.

The top cellophane film 17 is recovered in a spool 35 after being drawn upwardly over a roller 36.

The resulting gel coated laminate is recovered at the delivery end 10c of the run-out table.

Side edge cutting saws 37 are customarily provided for trimming the edges of the sandwich 33 prior to removal of the top cellophane film 17. A traveling saw 38 customarily is provided for transversely cutting the sandwich 33 into desired lengths, usually from 6 feet to 40 feet.

Customarily the sandwich 33 and the resulting laminate is formed in a corrugated profile although flat sheets also are manufactured for some applications.

Prior to application of the unsaturated polyester resin and glass fibers, it may be desirable to apply directly to the gel coat 20 a lamina for decorative or useful purposes, e.g., a non-woven veil of fibrous materials to protect the gel coat 20 or a woven or non-woven decorative fabric as described in U.S. Pat. No. 4,126,719.

THE UNSATURATED POLYESTER RESIN SYRUP

The unsaturated polyester resin syrup which is employed in the present laminates is customarily the polyesterification product of polycarboxylic acids or anhydrides and polyhydric alcohols. At least a portion of the polycarboxylic acid is ethylenically unsaturated polycarboxylic acid. Customarily the polycarboxylic acids are dicarboxylic acids such as phthalic acid, phthalic anhydride, terephthalic acid, isophthalic acid, endomethylene tetrahydrophthalic anhydride, adipic acid, succinic acid, halogenated dicarboxylic acids such as tetrabromophthalic anhydride and the like. The ethylenically unsaturated dicarboxylic acids customarily are maleic anhydride, maleic acid, fumaric acid, itaconic acid, citraconic acid, endomethylene tetrahydrophthalic anhydride. The unsaturated polyester resin normally is combined with 20 to 40 percent by weight of an ethylenically unsaturated copolymerizable monomer which is normally styrene but which may also be divinyl benzene, vinyl toluene, alpha methyl styrene, orthochloro styrene, methacrylic acid, acrylic acid, alkyl esters of acrylic or methacrylic acid, and the like. The mixture of unsaturated polyester resin and the copolymerizable ethylenically unsaturated monomer is identified in the trade as an unsaturated polyester resin syrup. The syrup also includes initiators such as organic peroxides; inhibitors such as quinones and catechols.

THE UV CURABLE GEL COAT RESINS

Any of the ethylenically unsaturated polymerizable resins which are curable in the presence of ultraviolet radiation and which possess superior weatherability when cured can be employed as the gel coat UV curable resinuos compositon. The ultraviolet curable resinous composition also must contain ultraviolet sensitizers such as benzophenone or 2,2-dimethoxy-2-phenyl acetophenone. The ultraviolet curable gel coat resin composition should not adhere to the cellophane film 17 which functions as the transparent carrier strip. The gel coat film 20 preferably has a thickness of 1 to 10 mils after cure. If the gel coat film is too thin, the glass fibers may penetrate the film as they are being applied or kneaded. Films which are too thin may develop objectionable pinholing which adversely affects the weatherability of the resulting laminate. If the ultra-violet radiation curable film 20 is too thick, the costs of the resulting product may be excessive inasmuch as the gel coat customarily is more expensive than the unsaturated polyester resin syrup. Gel coats which have excessive thickness may exhibit undesirable brittleness which may interfere with subsequent processing.

UV curable resinous compositions also are selected for optimum properties in the final product. For outdoor weather resistant characteristics, urethane acrylate or methacrylate resins are optimum. For chemical resistance, vinyl esters and polyepoxy acrylates or methacrylates are optimum. For abrasion resisting applications, urethane acrylates or methacrylates are optimum.

In general, any of the addition polymerizable resinous compositions can be cured on exposure to ultraviolet light in the presence of suitable initiators. Unsaturated polyester resin syrups, for example, can be partially or entirely cured by ultraviolet light exposure although intense exposure is required for extended periods in some instances. Other resinous compositions are more readily cured on exposure to ultraviolet light, for example, Epoxy acrylates which are reaction products of diepoxides with acrylic or methacrylic acid, for example, the reaction product of methacrylic or acrylic acid with diglycidal bisphenol A.

Urethane acrylates which are the reaction product of hydroxy alkyl acrylates with organic isocyanates, for example, the reaction product of toluene diisocyanate with hydroxy propyl methacrylate. Other urethane acrylates include reaction products prepared by combining organic diisocyanate, hydroxy alkyl acrylate or methacrylate and a polyol such as propylene glycol, a glycol diester, polycaprolactone diol.

EXAMPLE

A gel coat was applied in the fashion described in connection with FIG. 1. The gel coat included 5 grams of an unsaturated polyester resin formed by the reaction of neopentyl glycol, propylene glycol, adipic acid, maleic anhydride and phthalic anhydride. The resin also contained copolymerizable styrene and a quaternary ammonium salt as a promoter. 5 grams of the resin was combined with 1 gram methyl methacrylate, 0.1 grams methyl ethyl ketone peroxide and 0.12 grams of a UV sensitizer, specifically, 2,2-dimethoxy-2-phenyl acetophenone. An 8 mil film of the described gel coat was cured in 5 minutes exposure to an ultraviolet lamp. A phthalic acid maleic anhydride polyester resin syrup containing 20 percent methyl methacrylate, 1 percent methyl ethyl ketone peroxide, and 0.01 weight percent cobalt naphthenate was applied to the gel coat along with 2 ounce chopped glass fiber mat. The polyester and glass fiber mat were kneaded, coated with a top cellophane film and cured by heating.

The resulting reinforced plastic film had excellent weatherability as a result of the gel coat and did not exhibit any glass fiber blooming on the gel coat surface.

The product laminate can be described by reference to FIG. 3. In the cured product 40, two cellophane films 41, 42 confine a reinforced laminate having a first region 43 and a second region 44. The first region 43 is substantially free of glass fibers and has been cured at least partly by exposure to UV radiation. Hence the first region 43 also contains residues of ultraviolet radiation sensitizers. The second region 44 contains a substantially uniform distribution of randomly oriented glass fibers embedded within a cured mass of unsaturated polyester resin syrup. The second region 44 is free of residues of ultraviolet radiation sensitizers. The resinous components of the first region 43 are continuous with the resinous components of the second region 44.

An alternative embodiment of the present invention is illustrated in FIG. 4 which is a schematic illustration similar to FIG. 1 wherein corresponding elements have been supplied with corresponding prime numerals. In FIG. 4, a transparent carrier belt 47 is driven continuously around supporting rollers 48 so that the top run 49 of the carrier belt 47 moves from left to right across the drawing through a UV radiation zone 12'. A supply of gel coat resin is delivered from the gel coat resin tank 18' through a conduit 19' and deposited as a film 50 on the top run 49. The film 50 is delivered through the UV radiation zone 12' where it is exposed to ultraviolet radiation from sources 13' which are shown below the top run 49 although they could be provided above the top run 49 within the UV radiation zone 12' or in both locations as desired. Within the UV radiation zone 12', the gel coat resin film 50 is at least partially cured so that it can be transferred from the top run 49 to the top run 51 of a moving belt 52 which moves in the direction shown by the adjacent arrows around rollers 53. Additional resin from a resin supply tank 27' is delivered through one or both of the conduits 28a', 28b'. Glass roving 23' is delivered from a spool 22' through a chopper 24' which produces chopped glass fibers 25' which descend through a column 26' to the top run 51. The glass fibers and resin are kneaded by a roll 29' and covered with a sheet of cellophane 31' from a roll 30' by means of a roller 32'. The resulting sandwich is delivered through a heating zone 14', cooling zone 15' to the end of the carrier belt 52. The top cellophane sheet 31' is recovered on a roll 35'. The resulting laminate is delivered over supporting rollers 54 and has its side edges cut by an appropriate side edge cutting device 37' and is cut to length by an appropriate cutting device 38', e.g., a traveling saw.

The embodiment shown in FIG. 4 avoids the need for a carrier cellophane film and insulates the ultraviolet radiation sources 13' from exposure to volatile vapors arising from the gel coat film 50. The transparent carrier belt 47 preferably is fabricated from polyethylene terephthalate films which have great tensile strength and dimensional stability. Carrier belt 52 preferably is a stainless steel belt. In a preferred embodiment of the invention, the return run 55 of the carrier belt 52 will bypass the heating zone 14' to avoid reheating.

We claim:

1. In the method for manufacturing glass fiber reinforced plastic laminate which comprises applying glass fibers and unpolymerized unsaturated polyester resin syrup between two carrier films and thereafter heating the resulting sandwich until the said unsaturated polyester resin syrup is cured and thereafter removing the carrier films and recovering as a product a sheetlike mass of glass fibers which are embedded within the cured unsaturated polyester resin syrup, the improvement comprising:

applying to a first of said carrier films a resin layer of UV curable resinous composition containing an ultraviolet radiation sensitizer, exposing the said resin layer and the said first carrier film to ultraviolet radiation until the said resin layer is at least partially polymerized, thereafter applying the said glass fibers and unsaturated polyester resin syrup to the said resin layer and thereafter applying the second of said carrier films to complete the sandwich; and subsequently heating the sandwich to cure the said unsaturated polyester resin syrup and to polymerize any unpolymerized components of the said resin layer.

2. A method for manufacturing glass fiber reinforced plastic laminates comprising applying a resin layer of UV curable resinous composition containing an ultraviolet radiation sensitizer to a transparent carrier film;

exposing the said resin layer and the said carrier film to ultraviolet radiation until the said resin layer is at least partially polymerized;

withdrawing the said resin layer from the said transparent carrier film and depositing the said resin layer on a moving belt;

applying to the said resin layer on said moving belt randomly oriented glass fibers and unsaturated polyester resin and thereafter applying a covering film to form a sandwich consisting of the said covering film, the said resin layer and therebetween the said randomly oriented glass fibers and unsaturated polyester resin syrup; subsequently heating the said sandwich to cure the said unsaturated polyester resin syrup and to polymerize any unpolymerized components of the said resin layer;

removing said covering film thereafter recovering as a product a sheet-like mass of glass fibers which are embedded within the unsaturated polyester resin syrup but which do not penetrate the said resin layer.

3. A method according to claim 1 or 2 wherein the said UV curable resinous composition comprises a urethane acrylate or methacrylate.

4. A method according to claim 1 or claim 2 wherein the said UV curable resinous composition comprises a polyepoxy polyacrylate or methacrylate.

5. The method according to claim 2 wherein the said transparent carrier belt is fabricated from polyethylene terephthalate.

* * * * *